UNITED STATES PATENT OFFICE.

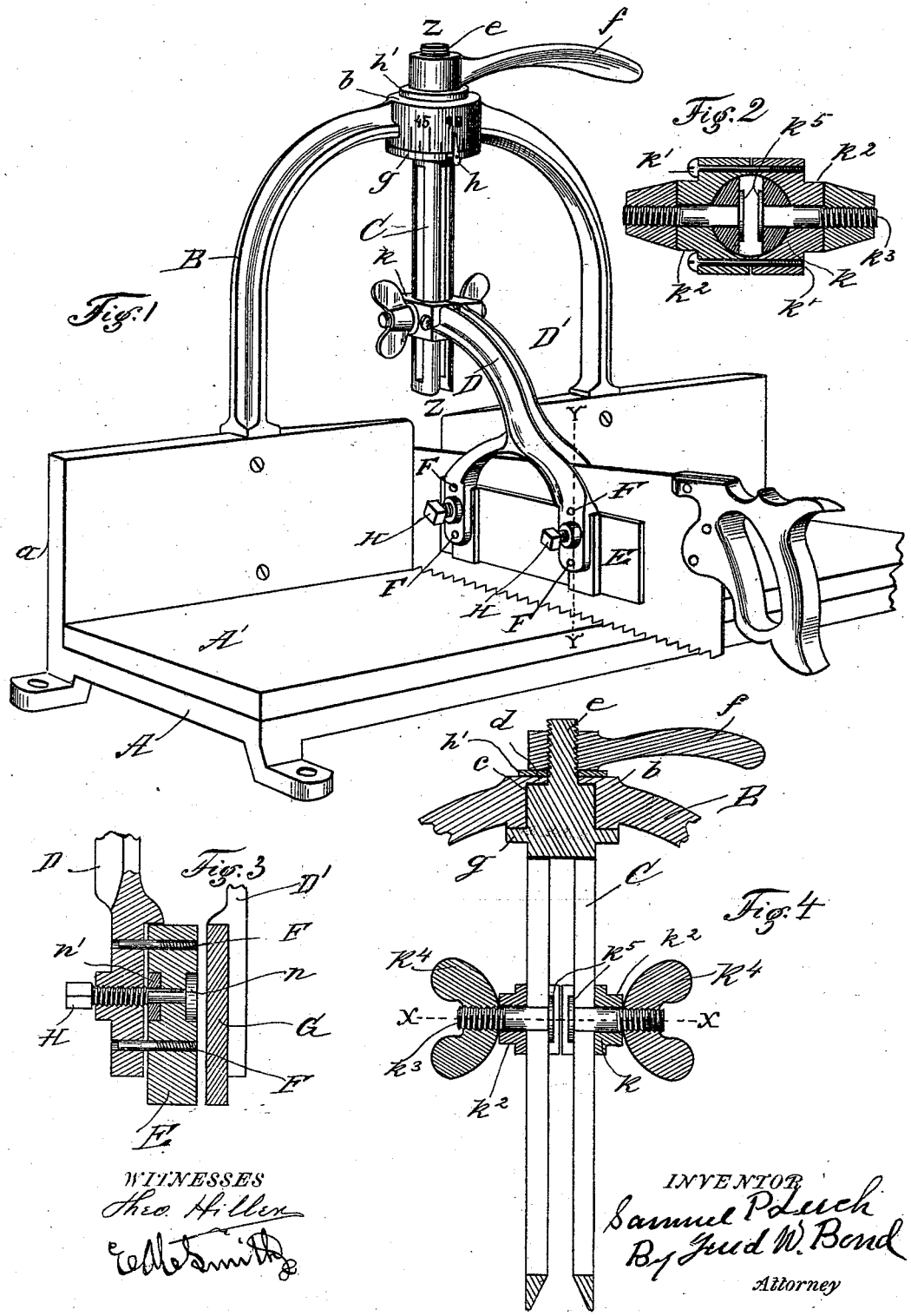

SAMUEL P. LERCH, OF CANTON, OHIO.

MITER-BOX.

SPECIFICATION forming part of Letters Patent No. 547,520, dated October 8, 1895.

Application filed March 2, 1895. Serial No. 540,282. (No model.)

*To all whom it may concern:*

Be it known that I, SAMUEL P. LERCH, a citizen of the United States, residing at Canton, in the county of Stark and State of Ohio, have invented certain new and useful Improvements in Miter-Boxes; and I do hereby declare that the following is a full, clear, and exact description of the same, reference being had to the annexed drawings, making a part of this specification, and to the letters of reference marked thereon, in which—

Figure 1 is a perspective view showing the different parts properly arranged with reference to each other. Fig. 2 is a transverse section through line X X, Fig. 4. Fig. 3 is a vertical section through line $y\ y$, Fig. 1. Fig. 4 is a vertical section through line Z Z, Fig. 1.

The present invention has relation to miter-boxes; and it consists in the different parts and combination of parts hereinafter described, and particularly pointed out in the claims.

Similar letters of reference indicate corresponding parts in all of the figures of the drawings.

In the accompanying drawings, A represents the base or bed, which is preferably formed of metal and is provided with the right-angled flanges $a$, to which right-angled flanges is attached the arch B, which arch is formed of a size to correspond with the size of the miter-box designed to be constructed. The top or upper portion of the arch B is provided with the disk $b$, which is preferably formed integral with the arch, and, as illustrated, its front or forward side or face is provided with a graduated scale, as illustrated in Fig. 1. The disk $b$ is provided with the central aperture $c$, which aperture is for the purpose of receiving the top or upper portion of the slotted arm C, and for the purpose hereinafter described the aperture $c$ is provided with the flange $d$, said flange being located at the top of the aperture $c$, as illustrated in Fig. 4.

The top or upper end of the slotted arm C is provided with the screw-threaded portion $e$, which screw-threaded portion is for the purpose of receiving the screw-threaded hand-nut $f$. Upon the slotted arm C is located the collar or flange $g$, which collar or flange is provided with the indicator $h$, said indicator being for the purpose of determining the number of degrees or the angle to be given to the saw by means of the guide-arms D and D' and their plates.

Upon the top of the disk $b$ is preferably located the collar $h'$, said collar being for the purpose of receiving the bottom or under side of the hand-nut $f$, as illustrated in Figs. 1 and 4.

To the inner ends of the guide-arms D D' are secured or formed integral therewith the heads or blocks $k$, which blocks are held in proper position with reference to each other by means of the screws $k'$, said screws being located and arranged substantially as illustrated in Fig. 2. The blocks or heads $k$ are each provided with the apertures $k^2$, through which apertures are located the screw-threaded bolts $k^3$, upon which screw-threaded bolts are located the screw-threaded nuts $k^4$. The inner ends of the screw-threaded bolts $k^3$ are each provided with the heads $k^5$, which heads are so arranged that they come in contact with the inner faces of the slotted arm C, and thereby clamp upon the arm C when the screw-threaded nuts are turned, so as to draw or pull the bolts $k^3$ outward, at which time the guide-arms D and D' are held at the desired point of vertical adjustment upon the slotted arm C.

When it is desired to change the vertical adjustment of the guide-arms D and D', together with their different parts, the screw-threaded nuts $k^4$ are turned so as to loosen the bolts $k^3$, at which time the guide-arms D and D' are free to be moved at any desired point upon the slotted arm C.

When it is desired to change the angularity of the guide-arms D and D', the hand-nut $f$ is loosened, after which the slotted arm C is free to rotate, and when the guide-arms, together with their different parts, have been brought into proper position with reference to their horizontal adjustment the hand-nut $f$ is tightened, thereby securely holding the guide-arms at the desired point of adjustment, it being understood that the guide-arms are securely clamped to the slotted arm C.

For the purpose of providing true adjustment for the saw the guide-arm D is provided with the adjustable plate E, which adjustable plate is held upon the bifurcated ends of the guide-arm D by means of the pins F, which pins are preferably screw-threaded upon their portions which are entered into the screw-threaded apertures formed in the guide-plate E, as illustrated in Fig. 3. For the purpose of adjusting the space between the guide-plates E and G the lug-bolts H are provided, which lug-bolts are extended through screw-threaded apertures formed in the bifurcated ends of the guide-arm D. The portions of the lug-bolts H which extend through the guide-plate E are smooth, and, as shown, they are provided with the disks or heads $n$ and $n'$.

The disks $n$ and $n'$ are for the purpose of moving the guide-plate E to and from the guide-arm D. It will be understood that as the lug-bolts H are turned in one direction the guide-plate E will be moved away from the arm D by means of the disk $n'$, and as the lug-bolts are turned in the opposite direction the guide-plate E will be brought toward the guide-arm D and away from the guide-plate G by means of the disks $n$.

The object and purpose of providing the adjustable plates E is to regulate the space between the plates E and G.

It will be understood that by my peculiar arrangement I am enabled to set the saw at any desired angle within the limits of the adjustment of the arms D D' upon the slotted arm C, said adjustment being sufficient to set the saw at any desired angle, inasmuch as said adjustment is nearly that of a semicircle.

For the purpose of preventing injury to the saw a board, such as A', is attached to the base A.

Having fully described my invention, what I claim as new, and desire to secure by Letters Patent, is—

1. The combination of a base having right angled flanges, an arch or standard carrying a pendent arm, the guide arms D and D', provided with the blocks or heads $k$ having the screw-threaded apertures $k^2$, the screw-threaded bolts $k^3$, provided with the screw-threaded nuts $k^4$, and the heads $k^5$, the screws $k'$ located through the blocks or heads $k$, and the adjustable guide arms D and D' carrying guide plates, substantially as and for the purpose specified.

2. The combination of a base provided with right angled flanges, an arch or standard secured to the flanges $a$, or their equivalents, the slotted arm C, having adjustably secured thereto the guide arms D and D', the guide arm D provided with the lug-bolts H, said lug-bolts having located thereon the disks $n$ and $n'$, the pins F, and the guide plates E and G, substantially as and for the purpose specified.

In testimony that I claim the above I have hereunto subscribed my name in the presence of two witnesses.

SAMUEL P. LERCH.

Witnesses:
   F. W. BOND,
   E. A. C. SMITH.